(12) United States Patent
Fries et al.

(10) Patent No.: US 9,471,589 B2
(45) Date of Patent: Oct. 18, 2016

(54) MANAGEMENT OF LONG-RUNNING LOCKS AND TRANSACTIONS ON DATABASE TABLES

(71) Applicant: International Business Machines Corporation, Armonk, NY (US)

(72) Inventors: Justin T. Fries, Raleigh, NC (US); Venkataraghavan Lakshminarayanachar, Bangalore (IN); Rajesh C. Lalgowdar, Bangalore (IN); Lohitashwa Thyagaraj, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/685,200

(22) Filed: Apr. 13, 2015

(65) Prior Publication Data

US 2015/0213050 A1    Jul. 30, 2015

Related U.S. Application Data

(63) Continuation of application No. 13/481,039, filed on May 25, 2012, now Pat. No. 9,037,558.

(51) Int. Cl.
*G06F 17/30* (2006.01)

(52) U.S. Cl.
CPC ... *G06F 17/30171* (2013.01); *G06F 17/30339* (2013.01); *G06F 17/30362* (2013.01); *G06F 17/30371* (2013.01); *G06F 17/30864* (2013.01)

(58) Field of Classification Search
CPC .................. G06F 17/30864; G06F 17/30171
USPC .......................... 707/669, 703, 704; 717/169
See application file for complete search history.

(56) References Cited

U.S. PATENT DOCUMENTS

| | | | |
|---|---|---|---|
| 7,640,242 B2 | 12/2009 | Chatterjee et al. | |
| 7,680,879 B2 | 3/2010 | Battat et al. | |
| 9,037,558 B2* | 5/2015 | Fries | G06F 17/30864 707/703 |
| 2005/0080759 A1 | 4/2005 | Brown et al. | |
| 2006/0265704 A1 | 11/2006 | Holt | |
| 2007/0226217 A1 | 9/2007 | Chatterjee et al. | |
| 2010/0161571 A1 | 6/2010 | Schwarzmann | |

OTHER PUBLICATIONS

Gough, Corey et al., "Kernel Scalability—Expanding the Horizon Beyond Fine Grain Locks", Proceedings of the Linux Symposium, vol. one, Jun. 27-30, 2007, Ottawa, Ontario, Canada, pp. 153-166.*
United States Patent and Trademark Office, Office Action for U.S. Appl. No. 13/481,039, Sep. 12, 2014, pp. 1-14, Alexandria, VA, USA.

(Continued)

*Primary Examiner* — Shahid Alam
(74) *Attorney, Agent, or Firm* — Lee Law, PLLC; Christopher B. Lee

(57) ABSTRACT

Establishment of an exclusive lock on each of an outer database ownership table and an inner database ownership table is attempted. In response to establishing the exclusive lock on each of the outer database ownership table and the inner database ownership table, a switch is made to a pair of overlapping shared locks on each of the outer database ownership table and the inner database ownership table. Release and re-acquisition of each of the pair of overlapping shared locks on the outer database ownership table and the inner database ownership table is alternated.

12 Claims, 5 Drawing Sheets

(56) References Cited

OTHER PUBLICATIONS

United States Patent and Trademark Office, Notice of Allowance for U.S. Appl. No. 13/481,039, Jan. 14, 2015, pp. 1-7, Alexandria, VA, USA.

Isabelle Mauney, Simon Kapadia, Configuring IBM WebSphere Process Server V6.1 with an Oracle Database, IBM Red Paper, Jul. 17, 2008, pp. 1-36, IBM Corporation, Poughkeepsie, NY, USA.

Author Unknown, Service integration, IBM Information Center Webpage, Web Application Server Version 7 Release 0, Initial publication date unknown, Last updated on Apr. 11, 2012, pp. 1-3, IBM Corporation, Published at: http://publib.boulder.ibm.com/infocenter/wasinfo/v7r0/index.jsp?topic=/com.ibm.websphere.zseries.doc/info/zseries/ae/welc6tech_si.html.

Author Unknown, Database lock considerations, IBM Information Center Webpage, iSeries Version 5 Release 3, 2002, pp. 1-3 (plus 1 citation page), IBM Corporation, Published at: http://publib.boulder.ibm.com/infocenter/iseries/v5r3/index.jsp?topic=%2Fdbp%2Frbafoapplck.htm.

Author Unknown, Lock Modes, MSDN Library: Microsoft SQL Server Database Engine (archived), Oct. 6, 2010, pp. 1-4, Microsoft Corporation, Published at: http://web.archive.org/web/20101006084446/http://msdn.microsoft.com/en-us/library/ms175519.aspx.

Author Unknown, Oracle RAC Cluster on CS4/GFS, Chapter 1.1 of Oracle Real Application Clusters GFS, 2006, pp. 1-6 (plus 3 citation pages), Red Hat, Inc., Published at: http://www.centos.org/docs/4/4.5/Oracle_GFS-en-US/sample_cluster.html.

Author Unknown, RCU-based dcache locking model, aLinux.tv Webpage, pp. 1-3 (plus 3 citation pages), May 16, 2010, Jay L. Klepacs & aLinux, Published at: http://alinux.tv/Kernel-2.6.34/filesystems/dentry-locking.txt.

David Tam, Performance Analysis and Optimization of the Hurricane File System on the K42 Operating System, Master's Thesis, 2003, pp. 1-99, Graduate Department of Electrical and Computer Engineering, University of Toronto, Canada, Published at: http://www.eecg.toronto.edu/~tamda/thesis.pdf.

Corey Gough, et al., Kernel Scalability—Expanding the Horizon Beyond Fine Grain Locks, Proceedings of the 2007 Linux Symposium, Jun. 27, 2007, pp. 153-166, vol. One, Linux Symposium Inc., Published at: http://www.kernel.org/doc/ols/2007/ols2007v1-pages-153-166.pdf.

* cited by examiner

MANAGEMENT OF LONG-RUNNING LOCKS AND TRANSACTIONS ON DATABASE TABLES

BACKGROUND

The present invention relates to database tables and long-running locks. More particularly, the present invention relates to management of long-running locks and transactions on database tables.

Messaging engines (MEs) provide a runtime environment for certain web application servers, such as Websphere® application servers (WAS). Each ME relies on a database to store runtime information along with application messages. Every ME maintains a set of tables to store its runtime and persistence information within the database for recovery in the event of disaster.

BRIEF SUMMARY

A method includes attempting to establish, via at least one processor, an exclusive lock on each of an outer database ownership table and an inner database ownership table; switching, in response to establishing the exclusive lock on each of the outer database ownership table and the inner database ownership table, to a pair of overlapping shared locks on each of the outer database ownership table and the inner database ownership table; and alternating release and re-acquisition of each of the pair of overlapping shared locks on the outer database ownership table and the inner database ownership table.

A system includes a memory device including an outer database ownership table and an inner database ownership table; and a processor programmed to attempt to establish an exclusive lock on each of the outer database ownership table and the inner database ownership table; switch, in response to establishing the exclusive lock on each of the outer database ownership table and the inner database ownership table, to a pair of overlapping shared locks on each of the outer database ownership table and the inner database ownership table; and alternate release and re-acquisition of each of the pair of overlapping shared locks on the outer database ownership table and the inner database ownership table.

A computer program product includes a computer readable storage medium including computer readable program code, where the computer readable program code when executed on a computer causes the computer to attempt to establish an exclusive lock on each of an outer database ownership table and an inner database ownership table; switch, in response to establishing the exclusive lock on each of the outer database ownership table and the inner database ownership table, to a pair of overlapping shared locks on each of the outer database ownership table and the inner database ownership table; and alternate release and re-acquisition of each of the pair of overlapping shared locks on the outer database ownership table and the inner database ownership table.

DETAILED DESCRIPTION

Figure 1:
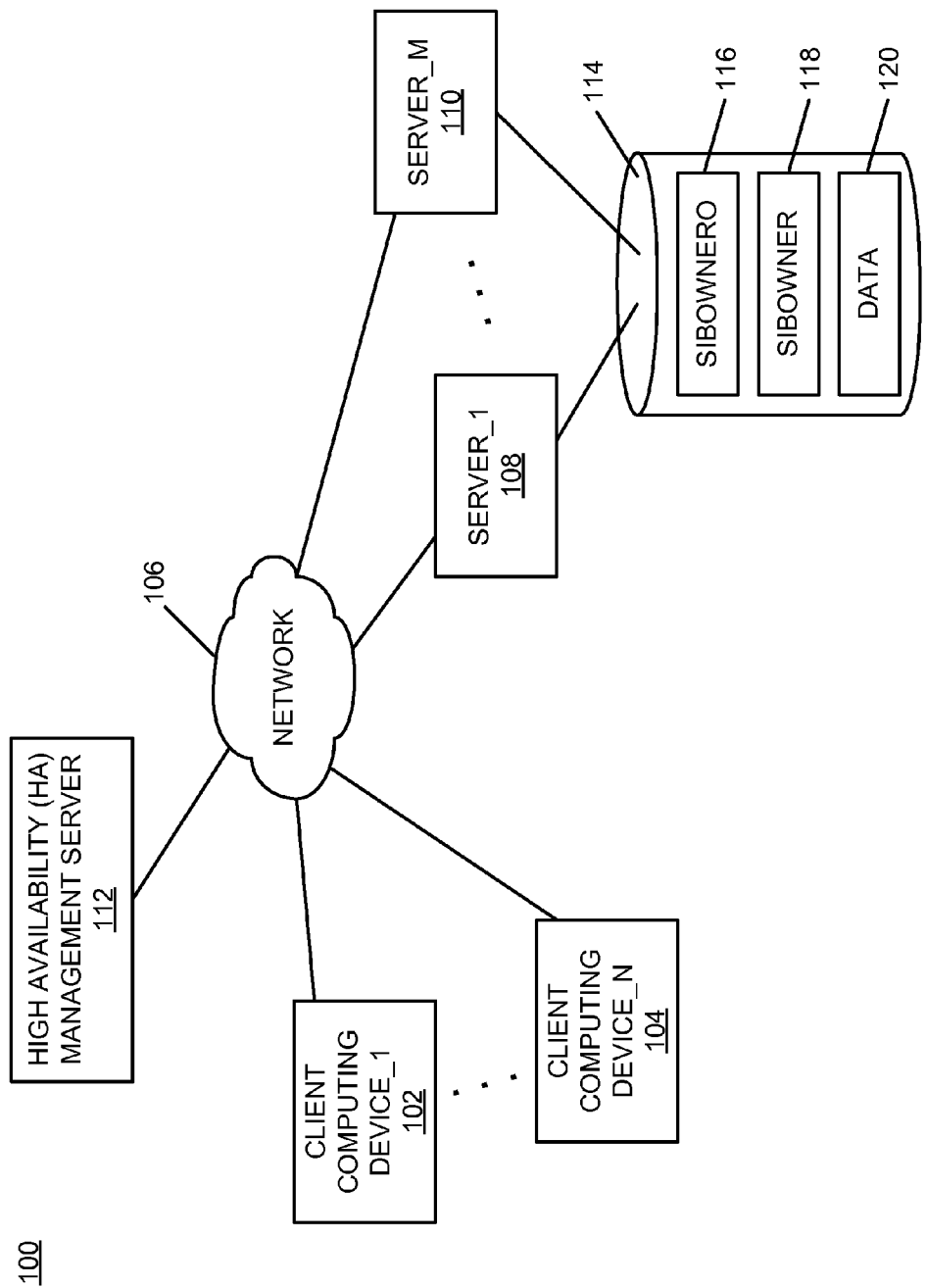
FIG. 1 is a block diagram of an example of an implementation of a system for management of long-running locks and transactions on database tables according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides technology for management of long-running locks and transactions on database tables. The present subject matter operates within the present examples using a messaging engine (ME), though other implementations are considered within the scope of the present subject matter. Because multiple messaging engine instances may be activated concurrently, each messaging engine performs initial processing to attempt to acquire exclusive ownership of a database/data store using exclusive locks on outer and inner database ownership tables. Once the exclusive locks are acquired by any messaging engine, that messaging engine designates itself as the owner of the database, releases the exclusive locks and commits table transactions on the respective database ownership tables, and transitions to overlapping shared locks and transactions on the inner and outer database ownership tables. The messaging engine further transitions to multi-threaded concurrent processing to alternate release and re-acquisition of the overlapping shared locks and overlapping shared transactions on the outer and inner database ownership tables. This use of overlapping shared locks and overlapping transactions ensures that no other messaging engine can take ownership of the database/data store, while providing intervals of time during which maintenance tools may access the respective database ownership tables for maintenance and/or update of the database/data store, as well as maintenance and/or update of the messaging engines themselves including the outer and inner database ownership tables. Accordingly, tools and batch processes running on tables (e.g., utilities such as ImageCopy, Backup, Analyzing queries, reorganization, backups, recovery, online version-to-version migration, versioning of messaging engines themselves, etc.) are not prohibited from executing by long-running transactions and exclusive locks.

It should be noted that conception of the present subject matter resulted from recognition of certain limitations associated with locks and transactions on database tables by messaging engines (MEs). For example, it was observed that redundant ME instances (identical entities) are utilized in messaging environments and only one is allowed to be active and access/own a data store (e.g., database) at any one time within the messaging environment, while the other ME(s) are on standby to prevent downtime in the event of failure of the active ME instance. However, it was further observed that it is possible for two application servers to lose contact with each other or for one to suspect that the other is unhealthy while a messaging engine instance is still actively performing database work. It was additionally observed that, as a result, service integration bus (SIBus/SIB) table space and table locks, maintained within a long-running transaction, are used to ensure that there is no possibility of two instances damaging customer data by attempting to update the messaging engine database concurrently. In was recognized that, in order to overcome this problem, MEs of previous systems hold "enduring locks" in the database, and that these enduring locks cause several issues and problems in a production environment. It was further observed that the problems described above are applicable to multiple operating systems and platforms (e.g., z/OS®, Linux®/Unix®/Windows® (LUW), etc.). It was additionally recognized that many systems operate within a twenty-four hour/seven days-per-week (24×7) production environment and that all maintenance and version-to-version migration is performed online (e.g., while systems are active). Within this context, it was determined that because the service integration bus (SIBus/SIB) messaging engine keeps locks as long as a WebSphere® Application Server (WAS) is active (e.g., the internal DB2® (Database 2) z/OS® skeleton package table (SKPT) Lock caused by not committing the connection), the skeleton package table space (e.g., SPT01 directory) database of DB2® is negatively affected. It was further determined that all operations that require an exclusive access on SPT01 (e.g., reorganization, backups, recovery, online version-to-version migration, versioning of messaging engines themselves, etc.) cannot run while enduring locks are held by an ME on the database/tables and that a WAS has to be shut down for these operations, which is not possible in a 24×7 production environment. It was further recognized that there are several applications connecting to these DB2® subsystems and that administrators may want to pool idle connections (e.g., connections that are inactive) to save resources. However, it was determined that such a pooling (e.g., ZPARM CMTSTAT) may only occur if the connections are committed periodically, which is not possible within previous systems while enduring locks are held by an ME on the database/tables. It was additionally recognized that other tools and batch processes run on all tables (e.g., utilities like Image-Copy, Backup, Analyzing queries, etc.). However, it was determined that because there is no commit operation within previous systems due to the enduring locks held by an ME on the database/tables, claims/drains are held, utilities may fail, and timeouts occur. It was further recognized that the locking problems are multiplied in implementations where database sharing is used.

In view of the several recognitions and determinations discussed above, it was concluded that if a database table is used to serialize several application server (e.g., WAS) instances, this should not be performed by locks that are held the whole life of an application server instance (e.g., messaging engine), even if this is only a shared lock, and that periodic commits may be used to eliminate the database maintenance and administration problems described above.

The present subject matter improves management of long-running locks and transactions on database tables by allowing ongoing maintenance operations, upgrades, and other service issues to be performed while instances of messaging engines are active, using periodic commits of transactions on database tables to temporarily release enduring locks held by the messaging engines. The present technology provides a solution of not holding a long-enduring exclusive lock on the tables, and instead alternating overlapping shared locks between two different tables, thus ensuring a timely commit of the transactions is performed and that there is no one single transaction that is open and running for a long duration. With these changes, the above problems are addressed, and at the same time the present technology ensures that no two different ME's are allowed to access the system tables concurrently.

For purposes of the present examples, two database ownership tables are utilized. However, it is understood that the present technology may be applied to additional database ownership tables without departure from the scope of the present subject matter. The two example database ownership tables represent an outer database ownership table and an inner database ownership table against which transactions are performed and locks are obtained to gain access to data within a database/data store. For ease of illustration of the following examples, the outer database ownership table will be referred as a service integration bus owner "outer" (SIBOWNERO) table, where the suffix "O" is appended. The inner database ownership table will be referred to as a service integration bus owner (SIBOWNER) table without any suffix. However, it is understood that other naming conventions may be used without departure from the scope of the present subject matter, and the present subject matter may be applied to any data area for which multiple instances of an entity are attempting to gain access to and control of the data area.

As detailed below, the present technology introduces overlapping transactions alternating between the SIBOWNER and SIBOWNERO tables. A shared lock by any messaging engine (ME) on either table will keep other MEs from taking over the database/data store. This approach also maintains a low profile for service interfaces, such as SIB, since no ME will have an excessively long-running transaction. As such, the present technology allows for periods of inactivity for both database ownership tables while an ME is active during which database tools may run normally to perform updates, analysis, and other database maintenance tasks, as described above and in more detail below.

The management of long-running locks and transactions on database tables described herein may be performed in real time to allow prompt processing of transactions and maintenance of database tables. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for management of long-running locks and transactions on database tables. A client computing device_1 102 through a client computing device_N 104 communicate via a network 106 with one or more of a server_1 108 through a server_M 110. Each of the server_1 108 through the server_M 110 execute one or more instances of an application server, such as a Websphere® application server (WAS), that may generally be referred to herein alternatively as messaging engine (ME) instances. A high-availability (HA) management server 112 manages the server_1 108 through the server_M 110 to ensure that only one messaging engine (ME) of one of the application server instances obtains ownership and control of a database 114. The client computing device device_1 102 through the client computing device_N 104 may interact with one another and with one or more of the server_1 108 through the server_M 110 using an ME instance.

An outer database ownership table SIBOWNERO table) 116 and an inner database ownership table (SIBOWNER table) 118 are utilized by the respective MEs of the application server instances to obtain a data area 120 of the database 114. As described above, for ease of illustration within the present examples, the outer database ownership table has been referred to as a service integration bus owner "outer" (SIBOWNERO) table 116, with the suffix "O" appended, while the inner database ownership table has been referred to as a service integration bus owner (SIBOWNER) table without any suffix. However, it is understood that other naming conventions may be used without departure from the scope of the present subject matter, and the present subject matter may be applied to any data area for which multiple instances of an entity are attempting to gain access to and control of the data area.

As will be described in more detail below in association with FIG. 2 through FIG. 4B, the server_1 108 through the server_M 110 provide automated management of long-running locks and transactions on database tables. The automated management of long-running locks and transactions on database tables is based upon use by messaging engines (MEs) of alternating enduring shared locks on the respective SIBOWNERO table 116 and the SIBOWNER table 118, and the selective/alternating release of these enduring shared locks to allow intervals of time for maintenance activities on the database to be performed without termination of the ME instance that currently owns the data area 120 of the database 114.

For purposes of the present example, all devices shown within FIG. 1 represent computing devices. It should be noted that the respective computing devices shown within FIG. 1 may be portable computing devices, either by a user's ability to move the computing devices to different locations, or by the computing device's association with a portable platform, such as a plane, train, automobile, or other moving vehicle. It should also be noted that the computing devices may be any computing device capable of processing information as described above and in more detail below. For example, the computing devices may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
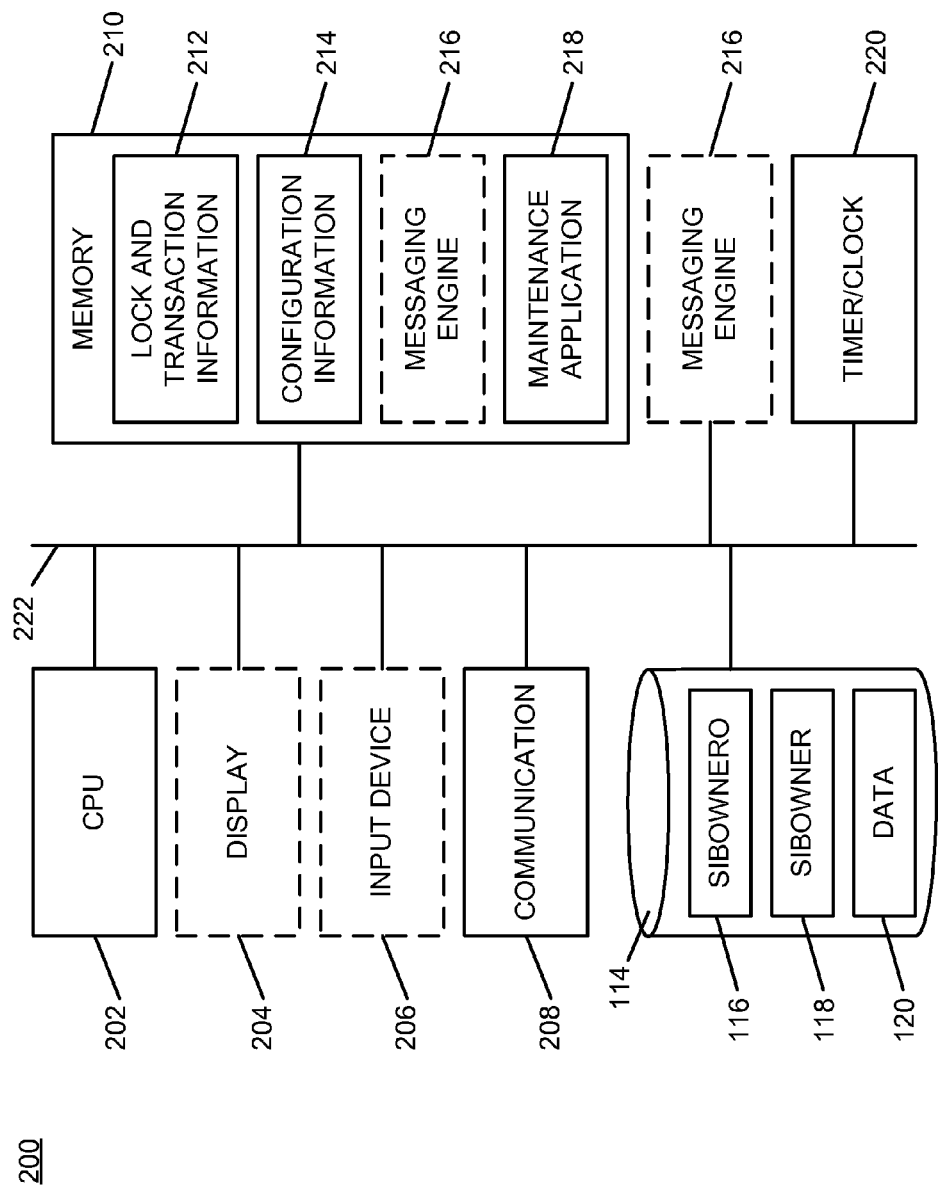
FIG. 2 is a block diagram of an example of an implementation of a core processing module capable of performing automated management of long-running locks and transactions on database tables according to an embodiment of the present subject matter.

FIG. 2 is a block diagram of an example of an implementation of a core processing module 200 capable of performing automated management of long-running locks and transactions on database tables. The core processing module 200 may be associated with any of the server_1 108 through the server_M 110, as appropriate for a given implementation, for implementation of the automated management of long-running locks and transactions on database tables described herein. The core processing module 200 may also be associated with any of the client computing device device_1 102 through the client computing device_N 104, and the HA management server 112, as appropriate for a given implementation. Further, the core processing module 200 may provide different and complementary processing of enduring locks and transactions on database tables in association with each implementation, as described in more detail below.

As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

The database 114 is also shown associated with the core processing module 200 within FIG. 2 to show that the database 114 may be coupled to the core processing module 200 without requiring external connectivity, such as via the network 106.

A memory 210 includes a lock and transaction information storage area 212 that stores universal identifiers (UIDs), lock status, and other information associated with ownership of a database table. A configuration information storage area 214 stores configuration information for use in association with alternating enduring locks on database ownership tables, such as the SIBOWNERO table 116 and the SIBOWNER table 118. The configuration information may be used to provide configured time delays for committing transactions on database ownership tables and releasing shared locks on database tables, and time delays for re-acquisition of shared locks, as described in more detail below, and other configuration information as appropriate for a given implementation.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A messaging engine 216 is illustrated in a dashed-line representation as both an application that is stored and executed from within the memory 210 by the CPU 202 and as a separate hardware component/module of the core processing module 200. It is understood that multiple instances of the messaging engine 216 may be instantiated/implemented in association with the core processing module 200 and that each such messaging engine 216 may attempt to gain ownership of the data area 120 of the database 114, as described above and in more detail below.

The memory 210 also includes a maintenance application 218 that may be utilized to update the database 114 as described above. The maintenance application 218 may be executed, for example, on any of the computing devices shown and described in association with FIG. 1.

Regarding the hardware component/module implementation of the messaging engine 216, though this module is illustrated as a component-level module for ease of illustration and description purposes, it should be noted that the messaging engine 216 may include any hardware, programmed processor(s), and memory used to carry out the functions of the messaging engine 216 as described above and in more detail below. For example, the messaging engine 216 may include additional controller circuitry in the form of application specific integrated circuits (ASICs), processors, and/or discrete integrated circuits and components for performing communication and electrical control activities associated with the respective devices. Additionally, the messaging engine 216 may include interrupt-level, stack-level, and application-level modules as appropriate. Furthermore, the messaging engine 216 may include any memory components used for storage, execution, and data processing for performing processing activities associated with the module.

It should also be noted that the messaging engine 216 may form a portion of other circuitry described without departure from the scope of the present subject matter. Further, as described above, the messaging engine 216 may alternatively be implemented as an application stored within the memory 210. In such an implementation, the messaging engine 216 may include instructions executed by the CPU 202 for performing the functionality described herein. The CPU 202 may execute these instructions to provide the processing capabilities described above and in more detail below for the core processing module 200. The messaging engine 216 may form a portion of an interrupt service routine (ISR), a portion of an operating system, a portion of a browser application, or a portion of a separate application without departure from the scope of the present subject matter.

A timer/clock module 220 is illustrated and used to determine timing and date information, such as for use in association with configured time delays for committing transactions on database ownership tables, as described above and in more detail below. As such, the messaging engine 216 may utilize information derived from the timer/clock module 220 for information processing activities, such as the management of long-running locks and transactions on database tables described herein.

The CPU 202, the display 204, the input device 206, the communication module 208, the database 114, the memory 210, the messaging engine 216, and the timer/clock module 220 are interconnected via an interconnection 222. The interconnection 222 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the SIBOWNERO table 116, the SIBOWNER table 118, and the data area 120 are shown within the database 114, they may also be stored within the memory 210 without departure from the scope of the present subject matter. Accordingly, the core processing module 200 may take many forms and may be associated with many platforms.

Figure 3:
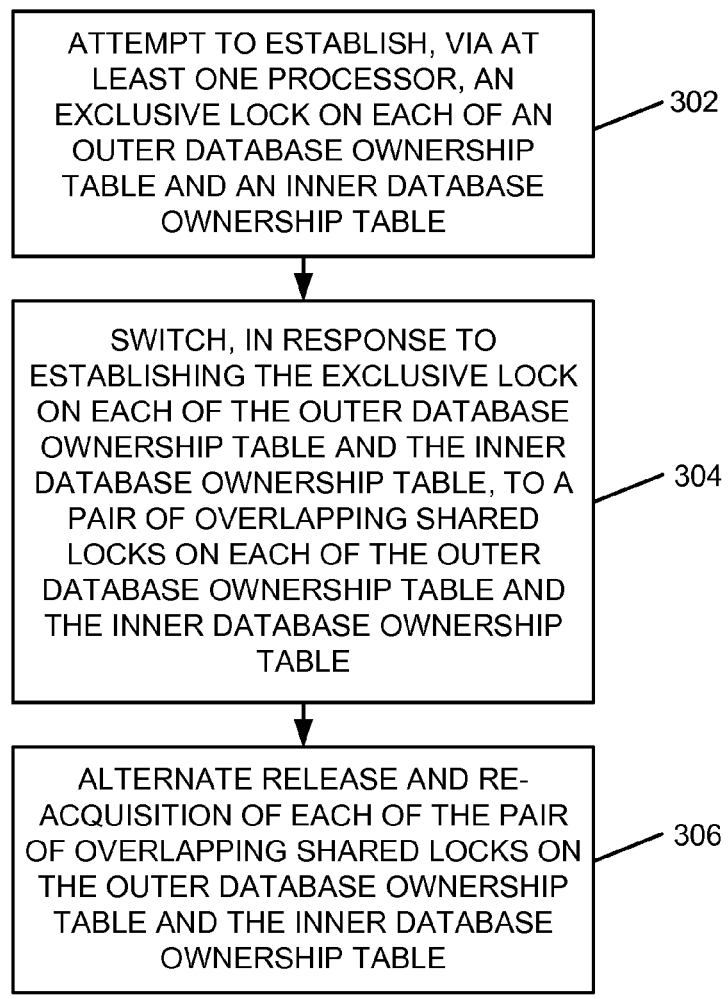
FIG. 3 is a flow chart of an example of an implementation of a process for automated management of long-running locks and transactions on database tables according to an embodiment of the present subject matter.
Figure 4A:
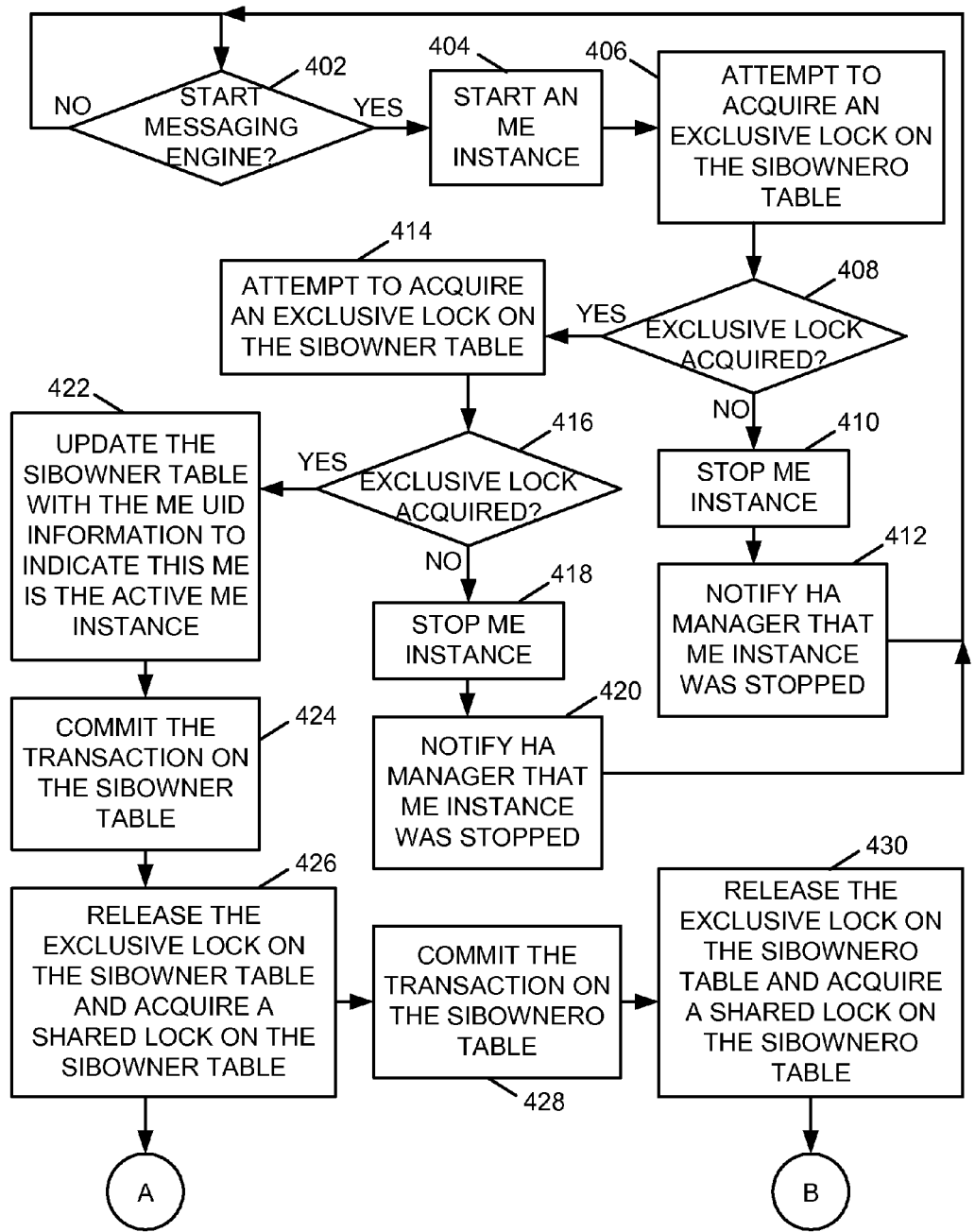
FIG. 4A is a flow chart of an example of an implementation of initial processing within a process for automated management of long-running locks and transactions on database tables using a multi-threaded messaging engine according to an embodiment of the present subject matter.
Figure 4B:
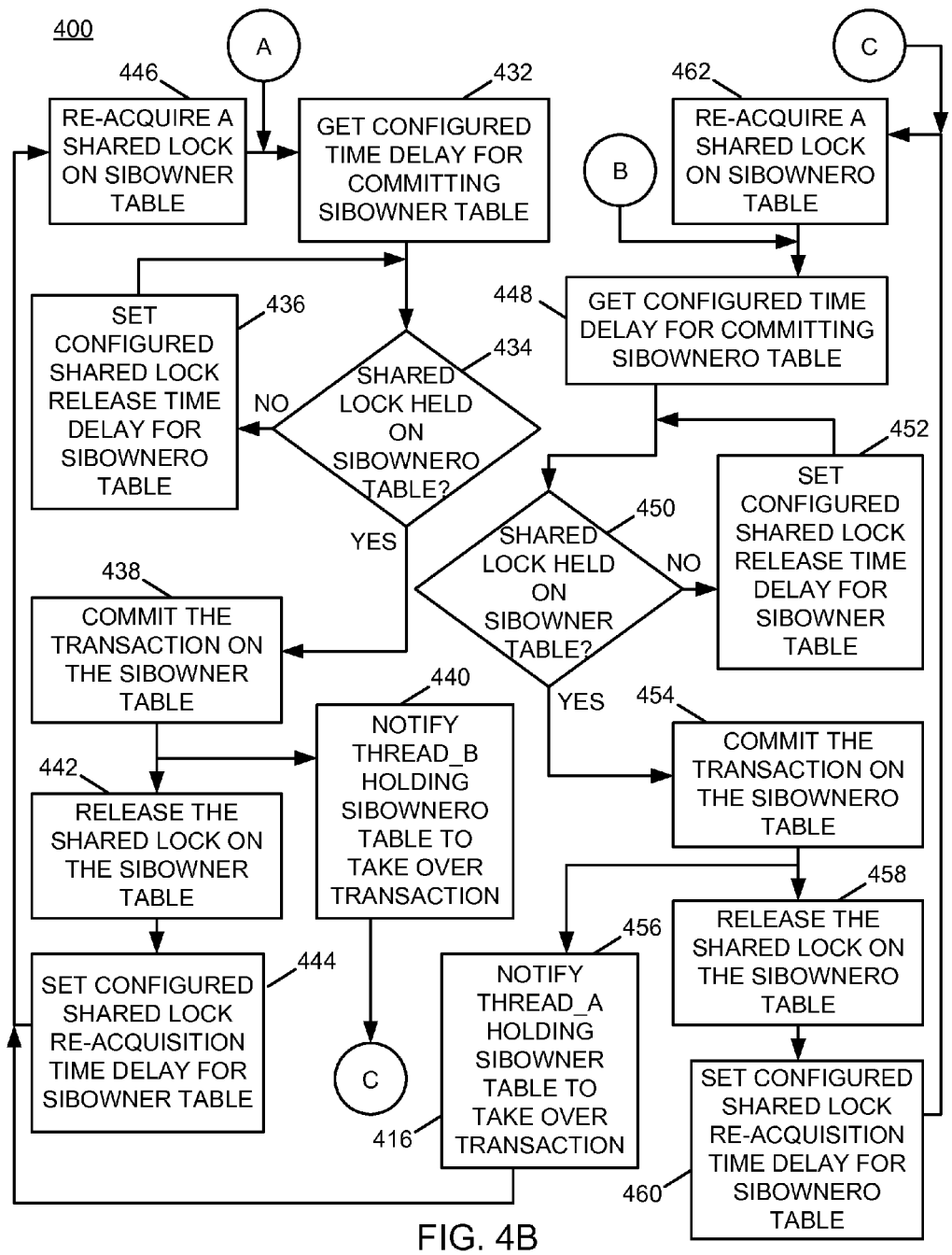
FIG. 4B is a flow chart of an example of an implementation of additional processing within a process for automated management of long-running locks and transactions on database tables using a multi-threaded messaging engine according to an embodiment of the present subject matter.

FIG. 3 through FIG. 4B described below represent example processes that may be executed by devices, such as the core processing module 200, to perform the automated management of long-running locks and transactions on database tables associated with the present subject matter. Many other variations on the example processes are possible and all are considered within the scope of the present subject matter. The example processes may be performed by modules, such as the messaging engine 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for automated management of long-running locks and transactions on database tables. At block 302, the process 300 attempts to establish, via at least one processor, an exclusive lock on each of an outer database ownership table and an inner database ownership table. At block 304, the process 300 switches, in response to establishing the exclusive lock on each of the outer database ownership table and the inner database ownership table, to a pair of overlapping shared locks on each of the outer database ownership table and the inner database ownership table. At block 306, the process 300 alternates release and re-acquisition of each of the pair of overlapping shared locks on the outer database ownership table and the inner database ownership table.

FIGS. 4A-4B illustrate a flow chart of an example of an implementation of a process 400 for automated management of long-running locks and transactions on database tables using a multi-threaded messaging engine. It should be noted that the process 400 may be executed by multiple messaging engines (MEs) and that each ME is assumed to be implemented as a multi-threaded module within the present example. However, it is understood that the processing described herein may be performed by a single-threaded module without departure from the scope of the present subject matter.

FIG. 4A illustrates initial processing within the process 400 and illustrates an initial lock acquisition phase during which exclusive locks on the outer and inner database ownership tables (SIBOWNERO and SIBOWNER, respectively) are acquired by a messaging engine to take ownership of the database/data store. As described in more detail below, these exclusive locks are released and converted to overlapping shared locks once ownership of the database/data store is obtained. It should be noted that once ownership of the database/data store is obtained, the overlapping shared locks on the database ownership tables will prevent other messaging engines from taking ownership of the database/data store. FIG. 4B illustrates a lock maintenance phase during which the overlapping shared locks on the outer and inner database ownership tables (SIBOWNERO and SIBOWNER, respectively) are alternately released and re-acquired. It should be noted that the processing during the lock maintenance phase operates without holding long-running locks. This processing allows maintenance tools, for example and as described above, to have access to the database ownership tables and to the data store for maintenance, versioning, and other authorized purposes, including updates to the messaging engines and database ownership tables themselves.

Within FIG. 4A, at decision point 402, the process 400 makes a determination as to whether a request to start a messaging engine (ME) has been received, such as via a startup sequence, reboot, or otherwise. In response to determining that a request to start a messaging engine (ME) has been received, the process 400 starts a messaging engine (ME) instance at block 404.

At block 406, the process 400 attempts to acquire an exclusive lock on the outer database ownership table, referred to as the SIBOWNERO table for purposes of the present example. At decision point 408, the process 400 makes a determination as to whether an exclusive lock on the SIBOWNERO table was acquired. It should be noted that acquiring the shared lock on the SIBOWNERO table also starts a transaction on the SIBOWNERO table. It should also be noted that this transaction that is opened, and all other table transactions that are described as being started herein, is/are different from an application transaction. In response to the application requesting the lock, the database (DB) implicitly creates a transaction and it is this transaction that is kept open until committed as described herein. In response to determining that an exclusive lock was not acquired, the process 400 stops the messaging engine at block 410. For example, another messaging engine may have already acquired the exclusive lock on the SIBOWNERO table. At block 412, the process 400 notifies the high availability (HA) manager that the messaging engine was stopped and returns to decision point 402 and iterates as described above.

Returning to the description of decision point 408, in response to determining that an exclusive lock on the SIBOWNERO table was acquired, the process 400 attempts to acquire an exclusive lock on the inner database ownership table at block 414, referred to as the SIBOWNER table for purposes of the present example. At decision point 416, the process 400 makes a determination as to whether an exclusive lock on the SIBOWNER table was acquired. It should be noted that acquiring the shared lock on the SIBOWNER table also starts a transaction on the SIBOWNER table. In response to determining that an exclusive lock was not acquired, the process 400 stops the messaging engine at block 418. For example, another messaging engine may have already acquired the lock on the SIBOWNER table. At block 420, the process 400 notifies the high availability (HA) manager that the messaging engine was stopped and returns to decision point 402 and iterates as described above.

Returning to the description of decision point 416, in response to determining that an exclusive lock on the SIBOWNER table was acquired, the process 400 updates the SIBOWNER table with the messaging engine universal/unique identifier (UID) information to indicate that the current messaging engine is the active messaging engine instance at block 422. It should be noted that acquiring the shared lock on the SIBOWNER table also starts a transaction on the SIBOWNER table. As such, and as described in more detail below, during the lock maintenance phase described in association with FIG. 4B, when a shared lock on the inner database ownership table (SIBOWNER) is released, a maintenance tool or other authorized process may view the messaging engine UID within the inner database ownership table to determine which messaging engine is the active messaging engine instance.

At block 424, the process 400 commits the transaction on the inner database ownership table (SIBOWNER). At block 426, the process 400 releases the exclusive lock on the SIBOWNER table and acquires a shared lock on the SIBOWNER table. Acquiring the shared lock on the SIBOWNER table also starts a transaction on the SIBOWNER table. At block 428, the process 400 commits the transaction on the outer database ownership table (SIBOWNERO). At block 430, the process 400 releases exclusive lock on the SIBOWNERO table and acquires a shared lock on the SIBOWNERO table. Acquiring the shared lock on the SIBOWNERO table also starts a transaction on the SIBOWNERO table.

Processing within the process 400 transitions to multi-threaded processing within the present example in response to acquiring the shared lock on the SIBOWNER table at block 426 as represented by the circled reference (A) and in response to acquiring the shared lock on the SIBOWNERO table at block 430 as represented by the circled reference (B). The process 400 transitions to the processing shown and described in association with FIG. 4B and performs multi-threaded processing of the overlapping shared locks on the inner and outer database ownership tables to alternate release and re-acquisition of each of the overlapping shared locks on the outer database ownership table and the inner database ownership table.

FIG. 4B illustrates additional processing associated with the process 400 for automated management of long-running locks and transactions on database tables using a multi-threaded messaging engine. As described above, FIG. 4B illustrates multi-threaded processing that initiates at the circled reference (A) and circled reference (B). For ease of description purposes, these threads will be referred to as "Thread_A" and "Thread_B," respectively, relative to the respective circled references. Each of these multi-threaded processes alternates release and re-acquisition of one of the overlapping shared locks on the respective database ownership tables. Thread_A operates to release and re-acquire the overlapping shared lock on the inner database ownership table (SIBOWNER), while Thread_B operates to release and re-acquire the overlapping shared lock on the outer database ownership table (SIBOWNERO).

Beginning with a description within FIG. 4B of Thread_A processing within the process 400 for alternating release and re-acquisition of the overlapping shared lock on the SIBOWNER table at the circled reference (A), the Thread_A of the process 400 gets a configured time delay for committing the SIBOWNER table, such as from the configuration information storage area 214 within the memory 210, at block 432. It should be noted that this time delay may be configured as a single time delay usable both for waiting to determine when ownership of the SIBOWNERO table is acquired by the other thread (e.g., Thread_B) and for waiting to re-acquire a shared lock on the SIBOWNER table by the current thread (e.g., Thread_A). However, this time delay may also be configured as two separate time delays, with a first time delay referred to within the present examples as a "shared lock release time delay" for waiting to determine when ownership of the SIBOWNERO table is acquired by the other thread (e.g., Thread_B) and a second time delay referred to within the present examples as a "shared lock re-acquisition time delay" for waiting to determine when to re-acquire the shared lock on the SIBOWNER table within the current thread (Thread_A).

For purposes of the present description, it should be noted that the process 400 operating within the current thread (Thread_A) has already acquired a shared lock on the SIBOWNER table, as described above in association with FIG. 4A. At decision point 434, the Thread_A of the process 400 makes a determination as to whether a shared lock is also held on the outer database ownership table (SIBOWNERO) by the other thread (e.g., Thread_B). In response to determining that a shared lock is not currently held on the SIBOWNERO table by the other thread (e.g., Thread_B), the Thread_A of the process 400 sets the configurable shared lock release time delay associated with acquisition of a lock on the SIBOWNERO table by the other thread (e.g., Thread_B) at block 436. This time delay ensures that the shared locks on both database ownership tables are overlapping prior to release of the shared lock on the SIBOWNER table by the current thread (e.g., Thread_A). This time delay also ensures that the respective transactions on the two database ownership tables are also overlapping prior to committing either transaction. To avoid crowding within the drawing figure, processing to determine when the configured shared lock release time delay has expired is not shown. However, it is understood to form a part of the processing within the Thread_A of the process 400.

In response to expiration of the configured shared lock release time delay, the Thread_A of the process 400 returns to decision point 434. In response to determining at decision point 434 that the shared lock is also held on the SIBOWNERO table by the other thread (e.g., Thread_B), the Thread_A of the process 400 commits the transaction on the inner database ownership table (SIBOWNER) at block 438. Two actions are performed responsive to commitment of the transaction on the SIBOWNER table by the Thread_A of the process 400. The first action performed by the Thread_A is to notify the Thread_B that is holding the SIBOWNERO table to take over the transaction at block 440. This action is symbolically represented within FIG. 4B by a transition represented by the circled (C), though this should not be considered limiting as the notification may be synchronous or asynchronous, and may occur with respect to any stage of processing within the Thread_B of the process 400. The second action performed by Thread_A is to release the shared lock on the SIBOWNER table at block 442.

The Thread_A of the process 400 sets the configured shared lock re-acquisition time delay for the SIBOWNER table at block 444. To avoid crowding within the drawing figure, processing to determine when the configured shared lock re-acquisition time delay has expired is not shown. However, it is understood to form a part of the processing within the Thread_A of the process 400. In response to expiration of the configured shared lock re-acquisition time delay, the Thread_A of the process 400 re-acquires the shared lock on the SIBOWNER table at block 446, and iterates back to block 432 to continue iterative processing to alternate the release and re-acquisition of the overlapping shared locks and transactions on the inner database ownership table as described above. Re-acquiring the shared lock on the SIBOWNER table also starts a new transaction on the SIBOWNER table. As such, the Thread_A of the process 400 alternates release and re-acquisition of the overlapping shared locks on the inner database ownership table (SIBOWNER), and alternates transactions and release of transactions on the inner database ownership table (SIBOWNER).

Regarding the Thread_B of the process 400 beginning at the circled (B) within FIG. 4B, the Thread_B performs processing for alternating release and re-acquisition of the overlapping shared lock on the outer database ownership table (SIBOWNERO). The Thread_B of the process 400 gets a configured time delay for committing the SIBOWNERO table, such as from the configuration information storage area 214 within the memory 210, at block 448. It should be noted that this time delay may be configured as a single time delay usable both for waiting to determine when ownership of the inner database should table (SIBOWNER) is acquired by the other thread (e.g., Thread_A) and for waiting to re-acquire a shared lock on the SIBOWNERO table by the current thread (e.g., Thread_B). However, this time delay may also be configured as two separate time delays, with a first time delay referred to within the present examples as a "shared lock release time delay" for waiting to determine when ownership of the SIBOWNER table is acquired by the other thread (e.g., Thread_A) and a second time delay referred to within the present examples as a "shared lock re-acquisition time delay" for waiting to determine when to re-acquire the shared lock on the SIBOWNERO table within the current thread (Thread_B).

For purposes of the present description, it should be noted that the process 400 operating within the current thread (Thread_B) has already acquired a shared lock on the outer database ownership table (SIBOWNERO), as described above in association with FIG. 4A. At decision point 450, the Thread_B of the process 400 makes a determination as to whether a shared lock is also held on the SIBOWNER table by the other thread (e.g., Thread_A). In response to determining that a shared lock is not currently held on the SIBOWNER table by the other thread (e.g., Thread_A), the Thread_B of the process 400 sets the configurable shared lock release time delay associated with acquisition of a lock on the SIBOWNER table by the other thread (e.g., Thread_A) at block 452. This time delay ensures that the shared locks on both database ownership tables are overlapping prior to release of the shared lock on the outer database ownership table (SIBOWNERO) by the current thread (e.g., Thread_B). This time delay also ensures that the respective transactions on the two database ownership tables are also overlapping prior to committing either transaction. To avoid crowding within the drawing figure, processing to determine when the configured shared lock release time delay has expired is not shown. However, it is understood to form a part of the processing within the Thread_B of the process 400.

In response to expiration of the configured shared lock release time delay, the Thread_B of the process 400 returns to decision point 450. In response to determining at decision point 450 that the shared lock is also held on the SIBOWNER table by the other thread (e.g., Thread_A), the Thread_B of the process 400 commits the transaction on the SIBOWNERO table at block 454. Two actions are performed responsive to commitment of the transaction on the SIBOWNERO table by the Thread_B of the process 400. The first action performed by the Thread_B is to notify the Thread_A that is holding the SIBOWNER table to take over the transaction at block 456. This action is symbolically represented within FIG. 4B by an arrow to the input of block 446 within the Thread_A processing, though this should not be considered limiting as the notification may be synchronous or asynchronous, and may occur with respect to any stage of processing within the Thread_A of the process 400. The second action performed by Thread_B is to release the shared lock on the SIBOWNERO table at block 458.

The Thread_B of the process 400 sets the configured shared lock re-acquisition time delay for the SIBOWNERO table at block 460. To avoid crowding within the drawing figure, processing to determine when the configured shared lock re-acquisition time delay has expired is not shown. However, it is understood to form a part of the processing within the Thread_B of the process 400. In response to expiration of the configured shared lock re-acquisition time delay, the Thread_B of the process 400 re-acquires the shared lock on the SIBOWNERO table at block 462, and iterates back to block 448 to continue iterative processing to alternate release and re-acquisition of the overlapping shared locks and transactions on the outer database ownership table as described above. Re-acquiring the shared lock on the SIBOWNERO table also starts a new transaction on the SIBOWNERO table. As such, the Thread_B of the process 400 alternates release and re-acquisition of the overlapping shared locks on the outer database ownership table (SIBOWNERO), and alternates transactions and release of transactions on the outer database ownership table (SIBOWNERO).

As such, the process 400 performs initial processing to acquire exclusive ownership of the database/data store using exclusive locks on the outer and inner database ownership tables. The process 400 then releases the exclusive locks, commits the respective table transactions, and transitions to overlapping shared locks and transactions on the inner and outer database ownership tables. The process 400 transitions to multi-threaded processing to alternate release and re-acquisition of overlapping shared locks and overlapping shared transactions on the outer and inner database ownership tables. This use of overlapping shared locks and overlapping transactions ensures that no other messaging engine can take ownership of the database/data store, while allowing intervals of time for maintenance and/or update of the database/data store and the messaging engines themselves including the outer and inner database ownership tables. Accordingly, tools and batch processes running on tables (e.g., utilities such as ImageCopy, Backup, Analyzing queries, etc.) are not prohibited from executing by long-running transactions and exclusive locks.

As described above in association with FIG. 1 through FIG. 4B, the example systems and processes provide technology for management of long-running locks and transactions on database tables. Many other variations and additional activities associated with management of long-running locks and transactions on database tables are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   by a messaging engine processor:
      attempting to establish an exclusive lock on each of an outer database ownership table and an inner database ownership table;
      switching, in response to establishing the exclusive lock on each of the outer database ownership table and the inner database ownership table, to a pair of overlapping shared locks on each of the outer database ownership table and the inner database ownership table; and
      alternating release and re-acquisition of each of the pair of overlapping shared locks on the outer database ownership table and the inner database ownership table comprising processing each of the outer database ownership table and the inner database ownership table within separate threads of the messaging engine processor, and where processing each of the outer database ownership table and the inner database ownership table within the separate threads of the messaging engine processor comprises:
         determining, within each thread, whether the other thread of the separate threads owns the respective other one of the inner database ownership table and the outer database ownership table processed by the other thread; and
         in response to determining that the other thread owns the other respective database ownership table:
            committing an overlapping shared lock transaction on the respective one of the inner database ownership table and the outer database ownership table processed within the current thread;
            releasing an overlapping shared lock of the pair of overlapping shared locks on the respective one of the inner database ownership table and the outer database ownership table processed within the current thread;
            setting a shared lock re-acquisition time delay; and
            in response to expiration of the shared lock re-acquisition time delay:
               re-acquiring the shared lock on the respective one of the inner database ownership table and the outer database ownership table processed within the current thread.

2. The method of claim 1, where switching, in response to establishing the exclusive lock on each of the outer database ownership table and the inner database ownership table, to the pair of overlapping shared locks on each of the outer database ownership table and the inner database ownership table comprises:
   releasing the exclusive lock on each of the outer database ownership table and the inner database ownership table;
   acquiring the pair of overlapping shared locks on each of the outer database ownership table and the inner database ownership table;
   committing an exclusive lock transaction on each of the outer database ownership table and the inner database ownership table; and
   starting processing of overlapping shared lock transactions on each of the outer database ownership table and the inner database ownership table.

3. The method of claim 2, where alternating the release and re-acquisition of each of the pair of overlapping shared locks on the outer database ownership table and the inner database ownership table further comprises:
   alternating commitment and re-start of the overlapping shared lock transactions on each of the outer database ownership table and the inner database ownership table.

4. The method of claim 1, further comprising:
   in response to determining that the other thread does not own the other respective database ownership table:
      setting a shared lock release time delay; and
      in response to expiration of the shared lock release time delay:
         re-determining, within each thread, whether the other thread owns the other respective database ownership table.

5. A system, comprising:
   a memory device comprising an outer database ownership table and an inner database ownership table; and
   a messaging engine processor programmed to:
      attempt to establish an exclusive lock on each of the outer database ownership table and the inner database ownership table;
      switch, in response to establishing the exclusive lock on each of the outer database ownership table and the inner database ownership table, to a pair of overlapping shared locks on each of the outer database ownership table and the inner database ownership table; and
      alternate release and re-acquisition of each of the pair of overlapping shared locks on the outer database ownership table and the inner database ownership table, comprising the messaging engine processor being programmed to process each of the outer database ownership table and the inner database ownership table within separate threads of the messaging engine processor, and where, in being programmed to process each of the outer database ownership table and the inner database ownership table within the separate threads of the messaging engine processor, the messaging engine processor is programmed to:
         determine, within each thread, whether the other thread of the separate threads owns the respective other one of the inner database ownership table and the outer database ownership table processed by the other thread;
         in response to determining that the other thread owns the other respective database ownership table:
            commit an overlapping shared lock transaction on the respective one of the inner database ownership table and the outer database ownership table processed within the current thread;
            release an overlapping shared lock of the pair of overlapping shared locks on the respective one of the inner database ownership table and the outer database ownership table processed within the current thread;
set a shared lock re-acquisition time delay; and
in response to expiration of the shared lock re-acquisition time delay:
re-acquire the shared lock on the respective one of the inner database ownership table and the outer database ownership table processed within the current thread.

6. The system of claim 5, where, in being programmed to switch, in response to establishing the exclusive lock on each of the outer database ownership table and the inner database ownership table, to the pair of overlapping shared locks on each of the outer database ownership table and the inner database ownership table, the messaging engine processor is programmed to:
release the exclusive lock on each of the outer database ownership table and the inner database ownership table;
acquire the pair of overlapping shared locks on each of the outer database ownership table and the inner database ownership table;
commit an exclusive lock transaction on each of the outer database ownership table and the inner database ownership table; and
start processing of overlapping shared lock transactions on each of the outer database ownership table and the inner database ownership table.

7. The system of claim 6, where, in being programmed to alternate the release and re-acquisition of each of the pair of overlapping shared locks on the outer database ownership table and the inner database ownership table, the messaging engine processor is further programmed to:
alternate commitment and re-start of the overlapping shared lock transactions on each of the outer database ownership table and the inner database ownership table.

8. The system of claim 5, where the messaging engine processor is further programmed to:
in response to determining that the other thread does not own the other respective database ownership table:
set a shared lock release time delay; and
in response to expiration of the shared lock release time delay:
re-determine, within each thread, whether the other thread owns the other respective database ownership table.

9. A computer program product comprising a computer readable storage medium including computer readable program code, where the computer readable storage medium is not a transitory signal per se and where the computer readable program code when executed on a computer implemented as a messaging engine causes the computer to:
attempt to establish an exclusive lock on each of an outer database ownership table and an inner database ownership table;
switch, in response to establishing the exclusive lock on each of the outer database ownership table and the inner database ownership table, to a pair of overlapping shared locks on each of the outer database ownership table and the inner database ownership table; and
alternate release and re-acquisition of each of the pair of overlapping shared locks on the outer database ownership table and the inner database ownership table, comprising the computer readable program code when executed on the computer causing the computer to process each of the outer database ownership table and the inner database ownership table within separate threads of the messaging engine, and where, in causing the computer to process each of the outer database ownership table and the inner database ownership table within the separate threads of the messaging engine, the computer readable program code when executed on the computer causes the computer to:
determine, within each thread, whether the other thread of the separate threads owns the respective other one of the inner database ownership table and the outer database ownership table processed by the other thread; and
in response to determining that the other thread owns the other respective database ownership table:
commit an overlapping shared lock transaction on the respective one of the inner database ownership table and the outer database ownership table processed within the current thread;
release an overlapping shared lock of the pair of overlapping shared locks on the respective one of the inner database ownership table and the outer database ownership table processed within the current thread;
set a shared lock re-acquisition time delay; and
in response to expiration of the shared lock re-acquisition time delay:
re-acquire the shared lock on the respective one of the inner database ownership table and the outer database ownership table processed within the current thread.

10. The computer program product of claim 9, where, in causing the computer to switch, in response to establishing the exclusive lock on each of the outer database ownership table and the inner database ownership table, to the pair of overlapping shared locks on each of the outer database ownership table and the inner database ownership table, the computer readable program code when executed on the computer causes the computer to:
release the exclusive lock on each of the outer database ownership table and the inner database ownership table;
acquire the pair of overlapping shared locks on each of the outer database ownership table and the inner database ownership table;
commit an exclusive lock transaction on each of the outer database ownership table and the inner database ownership table; and
start processing of overlapping shared lock transactions on each of the outer database ownership table and the inner database ownership table.

11. The computer program product of claim 10, where, in causing the computer to alternate the release and re-acquisition of each of the pair of overlapping shared locks on the outer database ownership table and the inner database ownership table, the computer readable program code when executed on the computer further causes the computer to:
alternate commitment and re-start of the overlapping shared lock transactions on each of the outer database ownership table and the inner database ownership table.

12. The computer program product of claim 9, where the computer readable program code when executed on the computer further causes the computer to:
in response to determining that the other thread does not own the other respective database ownership table:
set a shared lock release time delay; and in response to expiration of the shared lock release time delay:
re-determine, within each thread, whether the other thread owns the other respective database ownership table.

* * * * *